United States Patent Office 3,506,738
Patented Apr. 14, 1970

3,506,738
RESINOUS BLEND OF A BENZOGUANAMINE-FORMALDEHYDE RESIN AND A MELAMINE-FORMALDEHYDE RESIN
Alistair John Ross, Wallingford, Conn., assignor to American Cyanamid Company, Stamford, Conn., a corporation of Maine
No Drawing. Filed Dec. 20, 1966, Ser. No. 603,159
Int. Cl. C08g 37/32
U.S. Cl. 260—849                                   8 Claims

ABSTRACT OF THE DISCLOSURE

A resinous blend of from about 60% to 85%, and preferably 70%, by weight, of certain benzoguanamine-formaldehyde reaction products with correspondingly from about 40% to about 15% and preferably 30% of a melamine-formaldehyde reaction product.

BACKGROUND OF INVENTION

Aminotriazine resin molding compositions and, more particularly, melamine-formaldehyde molding compositions, have long been used to produce molded tableware articles, such as plates, cups, saucers, and the like. In the conventional use of coffee cups, it has been found that after prolonged exposure to coffee that the interior of the coffee cup tends to take on a straining which is not readily removeable. It has been found, as the prior art cited hereinbelow reveals, that a modification of a melamine resin by the use of benzoguanamine significantly enhances the coffee stain resistance. However, melamine-benzoguanamine-formaldehyde resins are prepared only with significant difficulty because of the ordinary water insolubility characteristics of benzoguanamine. It is, nevertheless, highly desirable to try to produce a glazing composition containing a benzoguanamine-formaldehyde reaction product which can be produced feasibly and commercially and which will, when applied in admixture with a melamine-formaldehyde resin to the interior of a molded melamine resin coffee cup, impart the desired measure of coffee stain resistance.

THE FIELD OF THE INVENTION

The field of the invention is in the area of melamine-formaldehyde resin molded articles particularly useful as tableware articles which have a desired measure of food strain resistance.

DESCRIPTION OF THE PRIOR ART

The know prior art is represented by the United States Patent No. 2,579,985, issued Dec. 25, 1951 and the United States Patent No. 2,781,533 as well as the reissue thereof, Re. 24,351, issued Aug. 27, 1957.

SUMMARY OF THE INVENTION

This invention relates to a composition of matter comprising a physical blend of (A) from about 60% to about 85%, by weight, of a benzoguanamine-formaldehyde resin having a mole ratio of from about 1:1 to about 1:4, respectively, and (B) correspondingly from about 40% to about 15%, by weight, of a melamine-formaldehyde resin having a mole ratio correspondingly from about 1:3 to about 1:1.4, respectively. More particularly, this invention relates to a resinous composition of matter as described hereinabove and in greater detail hereinbelow which finds particularly useful application as a glazing compound for use on molded resinous tableware articles, such as coffee cups which are otherwise susceptible to food staining wherein the glaze inhibits the molded article from food staining.

One of the objects of the present invention is to provide a resinous composition of matter which can be applied to a melamine resin dinnerware article so as to enhance the food stain resistance of the molded article. A still further object of the present invention is to apply a resinous blend of a benzoguanamine-formaldehyde resin and a melamine-formaldehyde resin to at least the inner surface or food contacting surface of a molded dinnerware article so as to enhance the food stain resistance of the molded article while not imparting crazing tendencies and gassiness to the glazing composition. These and other objects of the present invention will be discussed in greater detail hereinbelow.

The prior art as is represented by the U.S. Patent No. 2,579,985 clearly indicates that coffee stain resistance can be imparted to molded melamine resin dinnerware articles if the molded article is modified by having present therein certain quantities of benzoguanamine in a three component resinous reaction product, namely, a melamine-benzoguanamine-formaldehyde condensation product. A substantial plurality of different approaches have been tried in an endeavor to produce such a benzoguanamine-containing resinous composition without appreciable commercial success because of the difficulties encountered with benzoguanamine because of its relatively poor water solubility and, particularly, because of the relatively poor water solubility of the initial reaction products with formaldehyde. The melamine-formaldehyde resins are much more readily prepared because the melamine enjoys a significant measure of water solubility and even the reaction products of melamine and formaldehyde in the various stages of handling, of reaction and of subsequent condensation also display acceptable water solubility. However, when benzoguanamine is reacted with formaldehyde as an aqueous formaldehyde solution, there is, at the outset, the difficulty of getting the benzoguanamine into solution, and even after this has been achieved and the first reaction with formaldehyde takes place the methylol derivative whether it be the monomethylol derivative, the dimethylol derivative or the trimethylol derivatives, becomes so water insoluble as to be precipitated out of solution before any significant condensation can take place by way of an ether linkage or a methylene bridge. When melamine, benzoguanamine, and formaldehyde are reacted together in a three component system, the benzoguanamine-formaldehyde reaction is slow while the melamine-formaldehyde reaction is normally rapid. The resultant resinous material, when used to apply a thin film to a tableware article in the process of molding, was very gassy probably due to the insufficient reaction of the benzo guanamine with the formaldehyde and the melamine so that the resultant surfaced molded article displayed suface impefections in the nature of cracks and crazing and opaque white streaks. A further approach that had been tried without success was in the addition of the benzoguanamine and para-formaldehyde to the reaction sphere carrying out the reaction to the extent accomplishable followed after various time intervals with the addition of the melamine. When further processing is used to impart a glazing film to a molded article, gassiness was again experienced with the resultant surface defects. A still further approach, namely, the reaction of the melamine and the formaldehyde initially followed after various time intervals with the benzoguanamine addition, produced a product, which when processed to completion, had the same shortcomings as each of the preceding compositions.

The concept of the present invention resides in the blending of a separately prepared dry, powdered benzoguanamine-formaldehyde reaction product with a separately prepared dry, powdered melamine-formaldehyde reaction product. Ordinarily, the conventional additives are incorporated into the mix during the blending operation such as a mold lubricant, for example, zinc stearate and a curing catalyst, for example, phthalic anhydride. The ultimate material in preformed powder or granular form may then be used to impart a food stain resistant film on the surface to a melamine-formaldehyde resin molded tableware article.

The benzoguanamine-formaldehyde reaction product is prepared by reaction of a benzoguanamine with a form of formaldehyde and, preferably, paraformaldehyde, in a stoichiometrically calculated mole ratio varying between about 1:1 and 1:4 benzoguanamine to formaldehyde, respectively. It is preferred that there be used a mole ratio of benzoguanamine to formaldehyde of about 1:1.8, same basis. The melamine-formaldehyde mole ratio may be varied inversely with the benzoguanamine-formaldehyde mole ratio ranging between about 1:3 and 1:1.4 melamine to formaldehyde, respectively, and, preferably, 1:2, respectively. As a consequence, when the mole ratio of benzoguanamine to formaldehyde is low, such as at 1:1, respectively, the mole ratio of the melamine to formaldehyde should be high, such as 1:3, respectively. Reciprocally, when the mole ratio of the benzoguanamine to the formaldehyde is comparatively high, namely, 1:4, the mole ratio of the melamine to formaldehyde should be comparatively low, namely, about 1:1.4, respectively. The weight ratio of the benzoguanamine resin to the melamine resin can be varied between about 60%:40% and about 85%:15% benzoguanamine to melamine resins, respectively. It is preferred that there be used about 70% of the benzoguanamine resin to about 30% of the melamine resin. In all instances, the total percentages, by weight, will be 100%, based on the total weight of the benzoguanamine and the melamine resins. Where the ultimate molded article is to be of one color only and the color is to reflect the color of the base material, the resinous blend of the composition of the present invention should be a neat clear resin devoid of any filler, pigmentation, dye or other coloring material. However, when a two-toned molded article is desired, such as a color-on-color, the resinous blend of the present invention may have incorporated therein any of the conventional dyes and pigments which have been traditionally used in making aminotriazine resinous molding compositions.

Although the benzoguanamine-formaldehyde resins used in the present invention may be prepared in an aqueous medium, there are frequently some difficulties in carrying out the manipulative steps and it is, therefore, preferred that the benzoguanamine-formaldehyde reaction product be prepared by reacting benzoguanamine and paraformaldehyde at elevated temperatures in a substantially water free state thereby surmounting the water insolubility difficulties which the benzoguanamine and benzoguanamine resin components display.

The specific difficulty experienced in preparing benzoguanamine resins in the aqueous medium lies in the degree of reaction possible in the aqueous medium. The "tack" temperature of the resin so prepared is so low that on spray drying, the material does not give a dry powder, but sticks to the spray dryer walls. Even if this difficulty were overcome, it is so under-reacted that severe "gassing" would result on coreacting with melamine resins. The benzoguanamine-formaldehyde components of the composition of the present invention are believed to be mainly monomeric mono-, di-, tri-, and tetramethylol benzoguanamines with lesser quantities of the condensation dimers. It is calculated that the weight average molecular weight of these benzoguanamine reaction products is between about 220 and 520 on a 1.83:1 formaldehyde to benzoguanamine resin.

In order that the concept of the present invention may be more completely understood, the following examples are set forth in which all parts are parts, by weight, unless otherwise indicated. These examples are set forth primarily for the purpose of illustration and any specific enumeration of detail contained therein should not be interpreted as a limitation on the application except as is indicated by the appended claims.

BENZOGUANAMINE-PARAFORMALDEHYDE RESIN

Into a Baker-Perkins mixer there is introduced 456 parts (2.44 moles) of benzoguanamine. The mixer is heated by 25 lbs. of steam and there is then added 137.5 (4.46 moles) of 97% paraformaldehyde powder. After the paraformaldehyde addition is completed (1.83 moles of formaldehyde to 1 to benzoguanamine), the mixing is commenced. The temperature of the reactants is approximately 110° C. After approximately one hour of mixing, the mass becomes a clear fluid melt. After two hours and 20 minutes, the fluid melt which still has a temperature of 110° C. is poured into trays. A clear brittle resin results.

As a control measure, a dimethylformamide/water titration was run on samples of the resin according to standard manufacturing procedures. The titration was 18 cc. of water. This technique is described hereinbelow.

CONTROL TEST

The test is a variant of the familiar "hydrophobe" test. It measures degree of resin advancement arbitrarily on the basis that as the resin increases in molecular weight, the solubility in mixtures of DMF and water decreases, i.e., a 10 ml. solution at 25% solids of resin in DMF is titrated with water until precipitation begins. The amount of water required to cause precipitation falls with increasing molecular weight. Similarly, the "Dennis Bar" tack temperature increases. Typical figures are shown tabularly.

| cc./Water to Precipitate from 10 ml. 25% Resin in DMF | Weight Average Molecular Weight | Tack Temperature,°F. |
|---|---|---|
| 30 | 227 | 160 |
| 15.5 | 238 | |
| 10.5 | 252 | 180 |
| 5.2 | 357 | |
| 4.3 | | 226 |
| 2.8 | 510 | 265 |

All these determinations were made on a series of resins prepared from 1.83 moles of paraformaldehyde per mole of benzoguanamine, as in the above example. The different degrees of reaction were achieved by controlled heating over cycles as long as 3½ hours at temperatures up to 260° F. (126° C.). With the low molecular weight benzoguanamine resin, a low molecular weight (low hydrophobe) melamine resin was used in the ball mill blend. Similarly, with the higher molecular weight benzoguanamine resin a higher molecular weight melamine resin is used. This is in order to avoid one component flowing away from the other during the molding process. By this means the degree of "flow" of the resin over the inner surface can be controlled to give an optimum thickness. It has been found that with a clear glaze this optimum thickness lies between 0.5 and 2 mils. Thicknesses of less than 0.5 mil may not be sufficiently durable and at thicknesses of over 2 mil crazing and blistering may occur. With pigmented "color on color" formulations, the use of high pigment loading is necessary to achieve "hiding" in this relatively thin layer. Accurate control of film thicknesses is also particularly critical in this area. Generally, the degree of resin advancement required for pigmented glaze formulations is higher than for clear glaze for this reason.

Example 1

The benzoguanamine resin thus prepared is charged to a ball mill in an amount of 490 parts together with 260 parts of a commercially available melamine-formaldehyde resin (CYMEL 405) having a mole ratio of about 1:2 melamine to formaldehyde, respectively. The melamine-formaldehyde resin was prepared by normal technology from an aqueous formaldehyde medium followed by spray drying. To the blend of the two dry powdered resins there is then added 3.75 parts of phthalic anhydride, 3.55 parts of zinc stearate and 0.75 part of hexamethylene tetramine. About six pounds of ceramic balls are added to the ball mill and the grinding is commenced. After about three hours of grinding, the mill is opened and additional 0.94 part of zinc stearate is added. The grinding is then resumed for an additional one-half hour. The powder thus produced is pilled on a rotary pilling machine into pills weighing 0.75 gram. A melamine-formaldehyde cup is made in a conventional compression type molding machine by the following procedure. A high-frequency preheated pill of a melamine resin molding composition is placed in the mold at 335° F. and the press closed and a pressure of 2000–3000 p.s.i. is applied. Two seconds after closing the press, a "bump" breathe is made. This breathe is accomplished by opening the press and then closing it rapidly in order to allow for the escape of curing volatiles. The press is then maintained closed to allow the full cure of the press material. On completion of this base cure, the press is opened and a pill of the glazing compound of the present invention weighing approximately 0.75 gram is inserted in the internal portion of the molded article and the press is then closed under full pressure and kept under full pressure for about 30 seconds. Thereafter, the cup is removed from the mold and the "flash" is removed. As a control, a similar cup was prepared except that it was glazed simply with a melamine-formaldehyde glazing compound. Both cups were then immersed in a boiling coffee solution for sixteen hours. On removal and washing, the benzoguanamine-formaldehyde/melamine-formaldehyde blend glazed cup was unstained and uncrazed over the entire glazed area. The control cup glazed with a melamine-formaldehyde resin had stained heavily and had crazed badly.

Example 2

A benzoguanamine-formaldehyde resin is prepared using the same procedure as was used hereinabove except that 1122 parts of benzoguanamine powder and 558 parts of 97% paraformaldehyde are charged to a Baker-Perkins mixer heated with steam under a pressure of 25 p.s.i. After approximately 30 minutes, the powder went through a dough stage then gradually liquified. The progress of the reaction is followed by using the DMF/water titration technique outlined hereinabove.

After three hours, the viscous melt is poured into trays and allowed to cool. A clear, brittle resin with a DMF/water titration number of 5.0 resulted. Thereupon, a blend of 490 parts of the above resin, 260 parts of a melamine-formaldehyde 1:2 resin, 2.25 parts of phthalic anhydride, 3.75 parts of zinc stearate and 6 pounds of porcelain balls are charged to a ball mill. After three hours, 0.94 part of zinc stearate is added and the ball mill run for a further 30 minutes.

The resultant powder is preformed into pills and used to glaze cups as in the previous example. The amount of glaze used was about two times that used for a cup glazed with the 1.83:1 mol ratio resin in Example 1. This is due to the higher degree of resin advancement and higher reactivity of this resin. Cups molded from this glaze had good appearance and were as stain resistant as those prepared from the resin in Example 1.

I claim:
1. A glazing composition devoid of reinforcing filler comprising a physical dry blend of (A) from about 60% to about 85%, by weight, of a benzoguanamine-formaldehyde resin having a mole ratio of from about 1:1 to about 1:4, respectively, and (B) correspondingly from about 40% to about 15%, by weight, of a melamine-formaldehyde resin having a mole ratio correspondingly from about 1:3 to about 1:1.4, respectively wherein the benzoguanamine-formaldehyde resin and the melamine-formaldehyde resin have a degree of resin advancement such that during the molding process the resin mixture will flow uniformly wherein said dry blend when used to produce a glazing film on a molded article will impart a film of from 0.5 mil to 2 mils on said molded object which film-carrying molded object displays no streaking of the film after the molding operation and when the film-carrying molded object is subjected to immersion in boiling coffee for 16 hours will develop no coffee staining and no crazing.

2. The composition according to claim 1 in which the component (A) is present in an amount approximating 70%, by weight, and the component (B) is correspondingly present in an amount approximating about 30%, by weight.

3. The composition according to claim 1 in which the mole ratio of benzoguanamine to formaldehyde is about 1:1.8, respectively, and the mole ratio of the melamine to formaldehyde is about 1:2, respectively.

4. The composition according to claim 3 in which the component (A) is present in an amount approximating about 70%, by weight, and the component (B) is correspondingly present in an amount approximating about 30%, by weight.

5. A coffee cup carrying at least on its inner surface a thin glaze of the composition of claim 1.

6. A coffee cup carrying at least on its inner surface a thin glaze of the composition of claim 2.

7. A coffee cup carrying at least on its inner surface a thin glaze of the composition of claim 3.

8. A coffee cup carrying at least on its inner surface a thin glaze of the composition of claim 4.

References Cited

UNITED STATES PATENTS

| Re. 24,351 | 8/1957 | Varela et al. | 260—67.6 |
| 2,579,985 | 12/1951 | Varela et al. | 260—67.6 |
| 3,347,953 | 10/1967 | Kaess | 260—849 |
| 3,367,917 | 2/1968 | Granito | 260—67.6 |
| 3,379,661 | 4/1968 | Gynn et al. | 260—67.6 |

FOREIGN PATENTS 913,410   12/1962   Great Britain.

MURRAY TILLMAN, Primary Examiner

J. C. BLEUTGE, Assistant Examiner

U.S. Cl. X.R.

117—161; 156—331; 161—263; 260—67.6